United States Patent [19]

Seri

[11] Patent Number: 5,220,484

[45] Date of Patent: Jun. 15, 1993

[54] UNDERGROUND TRANSFORMER CABIN CONSISTING OF TWO UNITS, ONE INSIDE THE OTHER

[76] Inventor: Cosmo Seri, Contrada Fiastra, 85, 62020-Colmurano (MC), Italy

[21] Appl. No.: 832,240

[22] Filed: Feb. 7, 1992

[30] Foreign Application Priority Data

Dec. 2, 1991 [IT] Italy .......................... MC91A000014

[51] Int. Cl.⁵ .............................................. H05K 7/20
[52] U.S. Cl. .................................... 361/383; 361/384; 361/381; 361/390; 361/399; 174/15.1; 165/80.3
[58] Field of Search ............... 361/380, 381, 382, 383, 361/384, 385, 390, 393, 399, 415; 174/15.1, 15.2; 336/59, 60; 312/236; 165/104.14, 80.3

[56] References Cited

U.S. PATENT DOCUMENTS 3,749,981 7/1973 Koltuniak et al. ................... 317/100
4,665,466 5/1987 Green .................................. 361/384
4,901,200 2/1990 Mazura ............................... 361/379

FOREIGN PATENT DOCUMENTS 0966942 10/1982 U.S.S.R. .............................. 361/384

Primary Examiner—Leo P. Picard
Assistant Examiner—Young S. Whang
Attorney, Agent, or Firm—Leonard Bloom

[57] ABSTRACT

An underground transformer cabin consisting of two prefabricated vibrated reinforced concrete units, one inside the other. A larger external unit is enclosed by a covering plate, and a smaller, internal unit is raised off a bottom of the larger external unit so that there is a wide air space between the sides and bottom of the two walls. The bottom of said smaller internal unit has windows or openings through which fresh outdoor air flows into the smaller internal unit from underneath, passing first over the transformer and then into an outlet pipe which extend externally at a height above the inlet pipe.

1 Claim, 1 Drawing Sheet

UNDERGROUND TRANSFORMER CABIN CONSISTING OF TWO UNITS, ONE INSIDE THE OTHER

BACKGROUND OF THE INVENTION

An underground transformer cabin consisting of two units, one inside the other, in which the external unit is designed to support earth pressure, the weight of the covering plate and the stress caused by surface traffic, while the smaller internal unit is designed specifically for the installation of electrical equipment.

It is common knowledge that in cities and large urban areas, the enormous electric power needed and the lack of space, has made it necessary to build an increasing number of underground electric cabins.

To date, these cabins have always been box-shaped, consisting of a single large parallelepiped box made of reinforced concrete with two incorporated or applied air vents for the air flow and exchange in the cabin.

In fact, one of the most important technical specifications for these cabins is the specification requiring continuous and efficient natural ventilation of the cabins, to ensure adequate cooling of the transformer and to avoid the very dangerous formation of water condensation.

To provide adequate ventilation of the cabin, generally, partition panels are used to direct the incoming fresh air towards the base of the transformer, while the outlet openings for the hot air are provided at the top, opposite the inlet openings, in order to provide natural ventilation based on an ascending air current which passes through the electric cabin continuously.

SUMMARY OF THE INVENTION

The purpose of this invention is to design a new type of underground electric cabin specifically to improve the natural ventilation system of the unit since to date no satisfactory solution has been found for this particular and important technical problem.

The inventive solution consists of two prefabricated monolithic units made of vibrated reinforced concrete, having different sizes, so that one can be housed in the other.

The larger unit, that can be constructed on site, is constructed in compliance with all the technical specifications required by current standards, which, above all call for an elevated resistance to earth pressure, total water-tightness to water from the surface or water tables, resistance to heavy traffic.

The smaller unit which houses the electrical equipment, rests on a bottom supporting frame constructed at a certain height raised above the floor of the larger unit, so that a space is created between the two units which encircles the smaller unit around its four walls as well as under its floor.

This air space communicates to the interior of the smaller unit, through small windows on the floor of the latter as well as through a small perimeter space corresponding to the empty space between the top edge of the four walls of the smaller unit and the bottom surface of the covering plate of the larger external unit.

Fresh air from the exterior enters from under the floor of the smaller unit, while the output of heated air is positioned on the ceiling of the latter; this inlet is connected to a vertical pipe which opens to the exterior at a certain height from the ground, and which acts as a natural draught for the hot air inside the smaller unit, where the incoming air in the above external air space is in this way drawn in through the floor.

More specifically, inside the cabin a spontaneous ascending movement or natural flow of rising air is created, which flowing over the transformer, is heated; a part of this air is channeled into the output pipe and the remaining air downwards through the air space between the two units, due to the turbulence inside the cabin.

This air which circulates in the above space, passes (transfers) the heat to the surrounding ground through the walls of the larger unit, and is then mixed with the incoming fresh air and resumes its ascending upward movement together with the latter, again through the floor of the smaller unit.

Moreover, the internal unit is an important means of thermal accumulation which returns the heat absorbed to the room when the internal temperature of the cabin drops, for example, during periods of lower electrical energy absorption.

This new and revolutionary construction design with double units, the electric equipment installed inside the underground cabin according to the invention will have a natural and efficient ventilation which can adequately cool the transformer and prevent the formation of water condensation inside the cabin.

In this regard, it should be noted that the covering plate of the larger unit is insulated thermically so as to maintain the internal temperature as constant as possible, while keeping the temperature fluctuations between day and night to a minimum, and preventing sudden drops in temperature at night as a result of dispersion, to the exterior, of the heat accumulated by the covering plate. All these features contribute to avoiding condensation inside the cabin.

The cabin according to the invention also offers the advantage of having eliminated the bulky air vents with their wide air inlet and outlet grids, installed flush to the ground, since in this cabin the air exchange is through two small pipes, for intake and expulsion accordingly. For major clarity the description of the invention continues with reference to the enclosed drawings which are intended for illustrative purposes and not in a limited sense.

DESCRIPTION OF THE PREFERRED EMBODIMENT

Figure 1:
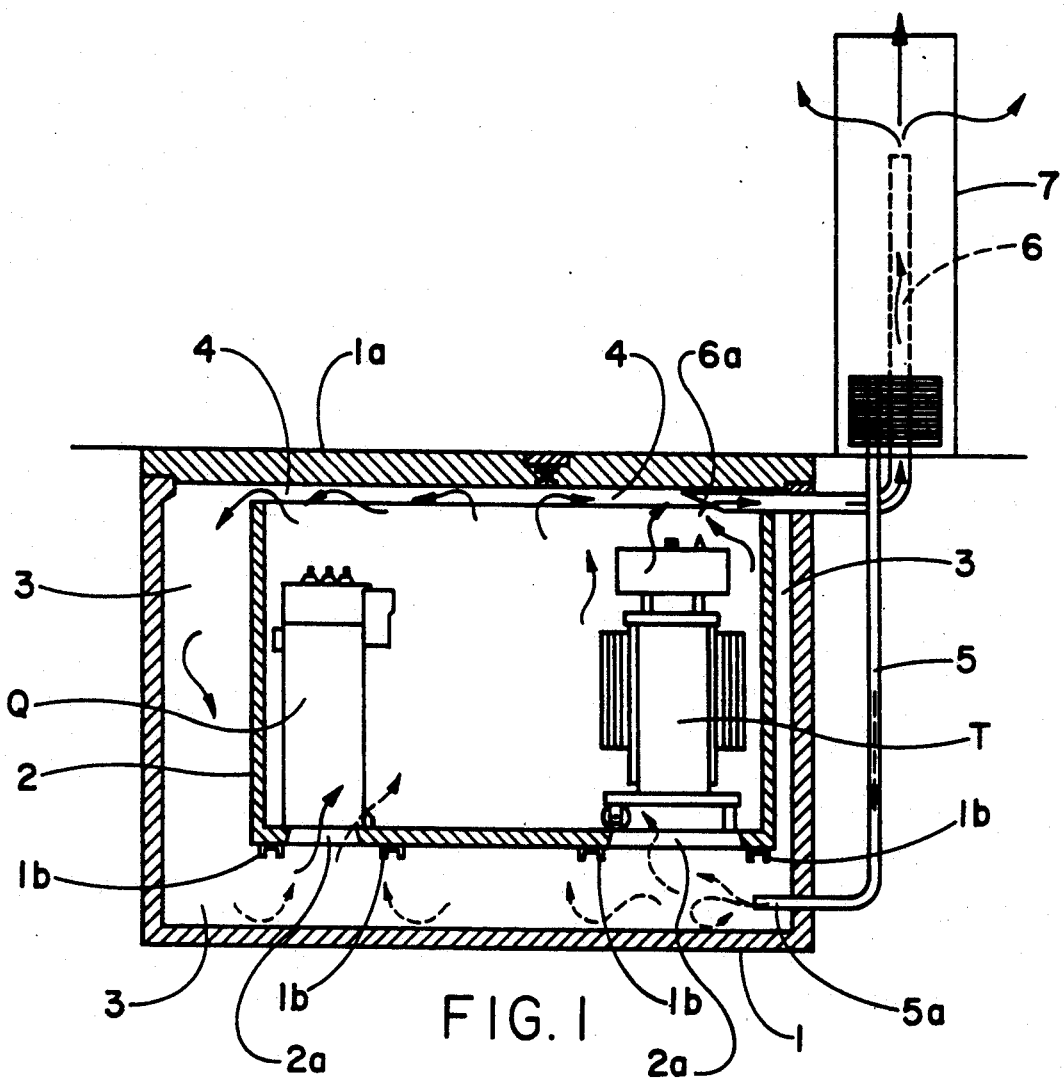
FIG. 1 illustrates the electric cabin according to the invention, cross-sectioned on a vertical plane.
Figure 2:
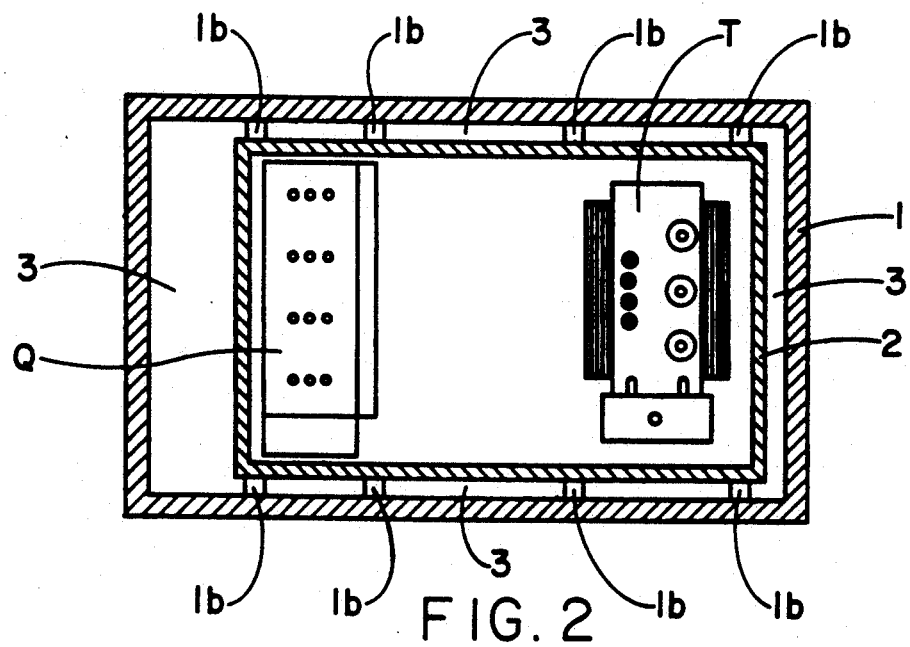
FIG. 2 is a plan view of the electric cabin according to the invention.

With reference to the above drawings, the underground electric cabin in question consists of two rectangular units, one of which is larger (1) than the other (2), which is housed inside the first (1).

The larger unit (1), namely the one which is to support the earth pressure, is covered at the top by a plate (1a) which is installed flush to the ground.

The smaller unit (2) is elevated with respect to the floor of the larger unit (1) since it rests on a supporting frame (1b) inside the larger unit (1), at a certain height above the bottom of the larger unit. The transverse dimensions of the smaller unit (2) ensure that there is an air space (3) between the smaller unit and the larger unit, the air space encircling the sides and the bottom of the smaller unit.

This air space (3) communicates to the interior of the unit (2) through windows (2a) on the floor (bottom) of the smaller unit (2) where the transformer (T) and the switchboard (Q) are positioned. The only other point through which the smaller unit (2) and the air space (3) communicate is between the perimeter space (4) which separates the top edge of the four sides of the unit (2) from the bottom surface of the above covering plate (1a).

The external (exterior) air intake pipe (5), after a first descending section installed outside the larger unit (1), terminates with a horizontal section (5a) with which it enters laterally into the latter, close to the bottom of the larger unit so as to convey the fresh air under the floor of the smaller unit (2), exactly where the air tends to enter through the windows (2a).

This fresh air flows over the transformer and is heated and then spontaneously rises towards the top of the unit (2), where the air outlet (6a) is positioned; said air outlet (6a) crosses (passes through) the sides of the two units and is joined to another vertical outlet pipe (6) through which the hot air is returned to the atmosphere.

FIG. 1 illustrates the air flow inside the cabin; the unbroken arrows refer to the hot air and the broken arrows to the fresh air.

Moreover, it should be noted that the height for the intake opening for the fresh air is lower than the height for the outlet (exit) opening for which is returned to the atmosphere.

In this regard, it should be noted that the air current inside the cabin can be adjusted by regulating this difference in height, in that the drain (outlet) pipe (6) acts as a flue, and creates a natural draft which will be increasingly efficient as its height with respect to the room air intake increases.

In FIG. 1, no. 7 indicates a metal structure for housing and protecting the pipes (5 and 6), which could alternatively be fixed on the walls of existing buildings or installed on urban structures, together with a low voltage switchboard.

Obviously, even though the double unit cabin according to the invention is designed especially for underground electric equipment, it can be used just as efficiently, according to the principles of this invention concept, for the installation of telephone exchanges, thermal plants, power generating units etc.

I claim:

1. An underground transformer cabin consisting of two units, one inside the other, comprising two prefabricated units in vibrated reinforced concrete, a larger external unit (1) having a top closed by a covering plate (1a) and a smaller internal unit (2) for an electrical equipment housing; the larger external unit having sides and a bottom, a supporting frame being disposed on said bottom, the smaller internal unit having sides, and a bottom, the bottom of the smaller internal unit resting on the supporting frame at a height above the bottom of the larger external unit wherein an air space is formed between the sides, and bottom of the smaller internal unit and the sides, and bottom of the larger external unit; said smaller internal unit (2) and the air space (3) intercommunicate through several windows (2a) on the bottom of the smaller internal unit (2) and through a perimeter space (4) which separates the top of the smaller internal unit (2) from the bottom surface of the covering plate (1a); an inlet pipe (5) for an external air having an initial descending section outside the larger external unit (1) and terminating with a horizontal section (5a) opening under the bottom of the smaller internal unit (2), an outlet opening (6a) for a hot air disposed at the top of the larger external unit, which passes through the sides of the two units and is joined to another section of an outlet pipe (6) opening exteriorly of the larger external unit, the another section of the outlet pipe extending to a height above the inlet pipe.

* * * * *